United States Patent [19]
Young

[11] 3,819,359
[45] June 25, 1974

[54] PINEAPPLE TREATMENT
[75] Inventor: Donald C. Young, Fullerton, Calif.
[73] Assignee: Union Oil Company of California, Los Angeles, Calif.
[22] Filed: Aug. 19, 1969
[21] Appl. No.: 851,436

[52] U.S. Cl............................ 71/127, 71/DIG. 1
[51] Int. Cl............................................ A01n 9/40
[58] Field of Search............................ 71/127, 65

[56] References Cited
UNITED STATES PATENTS
| | | | |
|---|---|---|---|
| 2,242,429 | 5/1941 | Johnson | 71/127 |
| 2,245,867 | 6/1941 | Mehrlich | 71/127 |
| 3,689,245 | 9/1972 | Weidman et al. | 71/67 |
| 3,692,512 | 9/1972 | Sachnik | 71/65 |

FOREIGN PATENTS OR APPLICATIONS
486,113   5/1938   Great Britain.................. 71/DIG. 1

OTHER PUBLICATIONS
Sachnik, 22nd Proceeding, So. Weed Sci., 1969, Pages 392-396.

Primary Examiner—James O. Thomas, Jr.
Attorney, Agent, or Firm—Richard C. Hartman; Dean Sandford; Michael H. Laird

[57] ABSTRACT

The method for forcing differentiation of the pineapple plant (flowering) or ripening of pineapples by treatment with ethylene as a discontinuous gas phase in an aqueous foam. In a typical embodiment, an aqueous foam comprising water, an oil-in-water surfactant to reduce surface tension and/or a viscous additive to increase the surface viscosity with a discontinuous ethylene-containing gas phase is applied to the pineapple plant. Typically, such a foam composition contains up to 10 volumes of ethylene per volume of liquid and the stability of the foam is sufficient to maintain the ethylene in contact with the pineapple foliage for a period from about 5 to about 300 minutes, adequate to permit thorough assimilation of the ethylene by the pineapple plant and effect differentiation.

10 Claims, No Drawings

PINEAPPLE TREATMENT

DESCRIPTION OF THE INVENTION

The invention relates to a method for treating pineapple plants with gaseous agents and, in particular, treatment of pineapple with highly volatile unsaturated hydrocarbons such as ethylene and acetylene to induce differentiation, i.e., flowering, of the plant as well as treatment to hasten ripening of the fruit.

Heretofore, pineapple plants have been treated with gaseous unsaturated hydrocarbons such as acetylene and ethylene to stimulate differentiation of the plant. There has, however, been no entirely satisfactory method for the application of the ethylene to fields of pineapple plants. U.S. Pat. Nos. 2,047,874 and 2,084,461 describe methods of enclosing the plant for the ethylene treatment. The use of molecular sieve adsorbents presaturated with ethylene is disclosed in U.S. Pat. Nos. 3,234,028 and 3,359,092. The use of oil emulsions as carriers is disclosed in U.S. Pat. No. 2,242,429 as a means of increasing the ethylene solubility of the treating medium. The present commercial practice is to apply an aqueous suspension of activated charcoal in water which is presaturated with ethylene. The maximum solubility of ethylene in such an aqueous medium is very low and approximately 1,000 gallons of water must be applied to achieve the minimum dosage of 2 pounds of ethylene per acre of pineapple plants necessary to achieve the enhanced differentiation. This application is customarily made during nocturnal hours to minimize loss of ethylene, however, it still results in spotty treatments which often require retreatment.

I have now found that pineapple plants can be readily treated with an effective amount of ethylene or other gaseous hydrocarbon while minimizing the quantity of water necessary as a carrier for the ethylene when the ethylene is applied as a discontinuous gas phase within an aqueous foam formed from water containing the necessary additives to decrease its surface tension and/or increase its viscosity sufficiently to provide aqueous foams having stabilities from about 5 to about 300 minutes or longer.

Various surface active agents can be added to achieve the lowered surface tension of the water while various water soluble polymers and viscous additives can be added to enhance the viscosity of the water and thereby stabilize the foam. Various mechanical techniques can be employed to produce the foam from the aqueous medium and the hydrocarbon vapor, e.g., a froth can be produced by admixing the aqueous medium and the gaseous hydrocarbon under high mechanical agitation or, preferably, the gaseous hydrocarbon, preferably ethylene, can be injected immediately upstream of a mixing nozzle which discharges the aqueous medium and produces a foam.

The various surface active agents which can be added to water to reduce its surface tensions from about 70 dynes per centimeter to a value of about 15 to about 50 dynes per centimeter, preferably to about 20 to about 40 dynes per centimeter, can in general be any of the conventional oil-in-water surfactants. The amount of the surface active agent so added can vary from about 0.1 to about 10, preferably from about 0.5 to 5 weight percent, and such surface activation can be of the cationic, anionic or nonionic type.

Examples of the cationic surfactants include: fatty amines, e.g., dodecylamine, octadecylamine (Armeens, Duomeens of Armour Chemical Company); alkarylamines, e.g., dodecyl aniline, fatty amides such as fatty imidazolines, e.g., undecylimidazoline prepared by condensing lauric acid with ethylene diamine or oleylaminodiethylamine prepared by condensing the oleic acid with asymmetric diethylene diamine (Sapamine CH by Ciba); quaternary alkyl and aryl ammonium salts and hydrates, e.g., cetyltriethyl ammonium cetyl sulfate, dimethylbenzyldodecyl ammonium chloride, etc.; quaternary ammonium bases of fatty amides of disubstituted diamines, e.g., oleyl methylamino ethylene diethylamine methyl sulfate (Sapamine MS by Ciba), oleylbenzylamino ethylene diethylamine hydrochloride (Sapamine ECH by Ciba); fatty derivatives of benzimidazolines such as are prepared by condensation of a fatty acid with orthophenylenediamine followed by alkylation of the condensate with an alkyl halide to yield an N-alkyl alkylbenzimidazole, e.g., N-methyl N,N'diethyl heptadecylbenzimidazole; N-fatty alkyl pyridinium compounds, e.g., lauryl pyridinium, octadecyl pyridinium (Fixanol of Imperial Chemical Industries), octadecyl methylene pyridinium acetate, etc.

Examples of useful anionic surface active agents include the following: fatty acid glyceride sulfonates and fatty acid sulfonates, e.g., sulfonated cottonseed oil, sulfonated oleic acid, sulfonated sperm oil, sulfonated tallow, etc.; sulfonated fatty amides, e.g., sulfonated amide of ricinoleic acid (Humectol CA by I. G. Farben), sodium salt of sulfuric ester of oleyl diisobutyl amide (Dismulgen V of I. G. Farben), etc.; sulfonated anilides of fats, e.g., sodium salt of sulfuric ester of oleylethyl anilide (Humectol CX by I. G. Farben), etc.; amides of aminosulfonic acids, e.g., sodium sulfonate of oleylmethyl tauride (Igepon T by I. G. Farben); amides from condensation of fatty acid chlorides with amino acids, e.g., sodium salt of oleyl sarcoside (Medialan A by I. G. Farben); sulfonated aromatic hydrocarbons, e.g., benzene sulfonic, naphthalene sulfonic acids and their ammonium and alkali metal salts, etc.; alkylaryl sulfonates, e.g., dodecylbenzene sulfonates, octadecylbenzene sulfonates, etc.

Illustrative nonionic compounds include the polyethylene oxide condensates with hydrophobic groups having a reactive hydrogen. The hydrophobic group can have from about 10 to 25 carbon atoms and from 2 to about 15 molecular weights of ethylene oxide are commonly condensed per molecular weights of hydrophobic group. The hydrophobic group can be selected from a variety of organic compounds having one or more reactive hydrogens including fatty alkyl or alkenyl alcohols, fatty acids, fatty amines, fatty amide, esterified hexitans or alkyl or alkenyl phenols.

As described, the source of the hydrophilic group is ethylene oxide. Other source materials can be employed, for example, ethylene chlorohydrin, or polyethylene glycol; however, because of its low cost and availability, ethylene oxide is used almost exclusively in the preparation of these materials.

The hydrophobic reactant can comprise an alkyl or alkenyl phenol wherein the alkyl or alkenyl group or groups contain between about two and about 16 carbon atoms. Among such compounds are the following: hexyl phenol, hexenyl phenol, hexadecyl phenol, dodecenyl phenols, tetradecyl phenol, heptenyl cresol, isoamyl cresol, decyl resorcinol, cetenyl resorcinol, isododecyl phenol, decenyl xylenol, etc. Examples of commercially available wetting agents belonging to this class and having a fatty acid constituent and containing ethylene oxide are the following: "Ninosol 100," "Ninosol 200" and "Ninosol 210" of the Alrose Chemical Company and "Nopalcol 4-D" of the Nopco Chemical Company.

A third class of hydrophobic reactants comprises the alkyl and alkenyl alcohols containing between about eight and about 22 carbon atoms. Among such alcohols are dodecanol, tridecanol, tetradecanol, pentadecanol, hexadecanol, heptadecanol, cotadecanol, decosenol, etc. A commercially available wetting agent of this type and containing ethylene oxide is Brij 30 of The Atlas Powder Company.

A fourth class of the hydrophobic reactants comprises long chain alkyl or alkenyl amines or amides containing between about eight and about 22 carbon atoms. These compounds contain two reactive hydrogens and the polyethylene oxide units are distributed therebetween. Examples of such compounds are dodecanamide, tridecylamine, tetradecenamide, pentenyl amine, hexadecyl amine, heptadecanamide, octadecyl amine, oleic amide, etc. Examples of commercially available wetting agents in this group containing ethylene oxide are "Ethomide" of The Armour Chemical Company and "Priminox 10" of the Rohm and Hass Chemical Company.

Another class of suitable wetting agents are the reaction products of ethylene oxide with fatty acid partial esters of hexitans. Such compounds are obtained by treating a hexitol, e.g., sorbitol, manitol, dulcitol, etc., with a dehydrating agent to form the corresponding hexitan, i.e., sorbitan, mannitan, dulcitan, etc. The hexitan is then partially esterified with a long chain fatty acid, having between about eight and about 22 carbon atoms, such as dodecanoic acid, pentadecanoic acid, hexadecanoic acid, oleic acid, stearic acid, etc., to replace one of the reactive hydrogens of the hexitan with the carboxylic radical. The resultant partial ester is then reacted with ethylene oxide. Commercially available compounds of this type are "Tween 65" and "Tween 81" of The Atlas Powder Company.

Very suitable emulsifiers comprise the organic substituted ammonium salts of sulfodicarboxylic acids that are reacted with various hydrophobic groups such as fatty amides having 12 to 18 carbons to prepare half amides in the manner described in U.S. Pat. No. 2,976,209, or with fatty amines having 12 to 26 carbons to prepare half amides in the manner described in U.S. Pat. No. 2,976,211, or with polyethoxylated fatty amines in the manner described in U.S. Pat. No. 3,080,280, or with fatty acid esters of hydroxyl amines to obtain half amides in the manner described in U.S. Pat. No. 2,976,208.

Various viscous additives can be added to the aqueous medium to increase its viscosity and thereby serve to enhance or stabilize the foam. Examples of such include various proteinaceous materials such as the naturally occurring vegetable and animal proteins having molecular weights from about 34,000 to about 200,000. Examples of such include casein with a molecular weight of from about 12,000 to 98,000; edestin with a molecular weight from about 29,000 to 200,000; hemoglobin having a molecular weight from about 16,000 to 67,000; egg albumin having a molecular weight from about 33,000 to 34,000 or serum albumin having a molecular weight from about 70,000 to 80,000. Other proteins include glutenin obtained from wheat, keratin obtained from animal horn and hoof, etc.

Another class of suitable viscous additives include the partially hydrolyzed polyacrylamides having from 5 to about 80 percent of the amide groups hydrolyzed to carboxylic acids and water soluble salts thereof, e.g., the alkali metal, ammonium and alkaline earth metal salts such as sodium, lithium, calcium, magnesium, etc. The polyacrylamides are obtained by conventional vinyl polymerization using a free radical initiator to produce a high molecular weight polyacrylamide which can be partially hydrolyzed simultaneously with, or subsequent to its polymerization. The hydrolysis of the polymer can be achieved by prolonged exposure of the polymer to elevated pH and temperature conditions, e.g., treatment of an aqueous solution containing from about 2 to about 15 percent of a polyacrylamide with an aqueous solution of sodium bicarbonate, sodium polyphosphate, trisodium orthophosphate, etc., at a pH of about 8 to 12 and a temperature from about 30° to 100°C. The hydrolysis is performed for a period of from about 2 to about 10 hours and sufficient to effect hydrolysis of from 5 to 8, preferably from about 12 to about 67 percent of the amide groups to carboxylic acid or the aforementioned soluble carboxylate groups.

Other additives that can be used to increase the viscosity of the material include the water soluble polyvinyl alcohol and partially hydrolyzed polyvinyl acetate. The polyvinyl alcohol is obtained by hydrolysis of polyvinyl acetate which, in turn, is obtained by the free radical solution bulk or emulsion polymerization of vinyl acetate using a free radical initiator. The polyvinyl acetate is thereafter hydrolyzed by conventional means, e.g., an aqueous solution of the polymer is maintained at an elevated temperature from 50° to 125°C. for a period of from 15 to about 240 minutes, sufficient to hydrolyze the acetate groups. The resultant polyvinyl alcohol is thereafter recovered from the aqueous medium by conventional means, e.g., spray drying.

Other water soluble materials that can be used to enhance the viscosity of the aqueous medium include various water soluble alginates, e.g., sodium alginate, potassium alginate, etc., as well as various cellulose derivatives such as carboxymethyl cellulose, hydroxyethyl cellulose, etc.

When the viscous additive is used, it is employed in a sufficient concentration to increase the viscosity of water to a level of about 5 to about 200 centipoises measured at 25°C., preferably to a viscosity of about 15 to about 75 centipoises. Of the aforementioned viscous additives, the proteinaceous materials are preferred since they exhibit desirable properties upon drying of the foam by maintaining the cellular integrity of the foam even though the water medium is evaporated from the foam.

The hydrocarbon gaseous treating agent which is used to promote differentiation and/or fruit ripening in pineapple can be a gas comprising the $C_2$ to about $C_4$ acetylenic or ethylenic hydrocarbons. Examples of such include ethylene, propylene, butene-1, butene-2, acetylene, methyl acetylene, dimethyl acetylene, ethyl acetylene, etc. Of these, acetylene and ethylene are the most active and ethylene is the most preferred.

The hydrocarbon vapor and the aqueous medium are mixed in suitable volumetric proportions, e.g., from about 3/1 to about 20/1, preferably from about 5/1 to about 15/1, and most preferably from about 7/1 to about 12/1 parts ethylene per part of liquid volume ratios can be used.

The foam produced is applied to the pineapple plants using conventional application equipment such as the standard spray rig employed on pineapple plantations which has approximately a 100-foot boom that extends 50 feet to either side of the rig and is equipped for supplying an aqueous spray to the pineapple plants beneath the boom. Such equipment can be modified for application of this invention by providing an ethylene distributor along the length of the boom with means to admix the ethylene and aqueous spray from the boom at a point upstream of the aqueous spray discharge nozzle at each of the nozzle locations along the length of the boom. The nozzles can be modified to provide nozzles having a high pressure drop, i.e., a minimal orifice diameter to intimately admix or thoroughly agitate the mixture of aqueous media and gaseous hydrocarbon as it is discharged from the nozzle and thereby form the requisite foam.

The resultant foam is applied to the pineapple plants at the proper development stage of the plant and at a sufficient dosage to provide a concentration of ethylene on the plants from about 1 to about 15 pounds ethylene per acre. The dosage can be varied somewhat depending on the treatment. Thus, when differentiation is desired, the plants are treated when they reach a sufficient size to bear marketable fruit of optimum size, generally at about 12 to 20 months after planting for the plant crop and about 6 to 12 months after harvesting the preceding crop for the ratoon crops. Preferably from about 1.5 to about 3 pounds of the hydrocarbon per acre of the pineapple treated is applied to facilitate differentiation. When the treatment is made to ripen the fruit, the application is made about 45 to 5 days, preferably 30 to 10 days before harvesting and the amount of ethylene applied can be varied from 1 to 15, preferably from 5 to about 12 pounds ethylene per acre.

To illustrate the preferred mode of practice, the invention is applied to a row of pineapple plants approximately 11 months after planting by use of a spray rig which is provided with spray nozzles adapted to direct the foam onto the foliage of the pineapple plant as it is moved along the row of plants. Ethylene under a pressure of about 125 psig is discharged into admixture with a stream of an aqueous medium immediately upstream of the discharge nozzle from the system. The ethylene is supplied at a flow rate of approximately 10 volumes of ethylene per volume of aqueous medium. The aqueous medium employed contains 1.5 weight percent Orvus ES, a commercial oil-in-water surfactant and 1.0 weight percent of carboxymethyl cellulose. The resultant foam is applied at a dosage of 2 pounds of ethylene per acre. In a comparable experiment, the present commercial practice of applying ethylene in saturation with an aqueous suspension of activated charcoal is applied to an adjacent row of pineapple. The total volume of spray necessary to achieve the comparable 2 pounds of ethylene per acre dosage is 1,000 gallons. Within about 40 minutes after application, the water has evaporated and/or drained from the pineapple plants and no evidence of treatment of the plants using the commercial practice remained, whereas at such time, the foam still remains visibly present on the plants. After a period of about 7–8 weeks after the treatment, the plants are inspected and it is found that the plants treated with the ethylene foam exhibit a higher percentage differentiation than the plants treated with the common commercial method of application of ethylene and both treatments exhibit a greater differentiation than the untreated plants.

Pineapple fruit is ripened by the application of an ethylene foam prepared and applied similarly to that in the preceding experiment, however the ethylene is employed at a concentration of about 15 volumes per volume of aqueous solution. The foam is applied at sufficient dosage to provide about 12 pounds ethylene per acre to pineapple plants bearing slightly immature fruit and persists on the plants for about 220 minutes after application. When the fruit is harvested, about 25 days after the treatment, it is found that the treated fruit is more uniform and advanced in maturity than the untreated fruit.

The preceding illustrations are not intended to unduly limit the invention, but instead it is intended that the disclosed as well as obvious equivalents of the materials and method steps described therein be included in the scope of the invention.

I claim:

1. In the method for enhancing differentiation in a pineapple plant wherein the foliage of the plant is treated with a volatile, unsaturated hydrocarbon having from two to about four carbons, the improvement which comprises applying to said foliage an aqueous foam having a discontinuous gas phase comprising an effective amount of said hydrocarbon to enhance differentiation and a continuous aqueous phase containing an additive from the class consisting of surface active agents, water soluble polymers and mixtures thereof in an amount sufficient to maintain said foam for a period of from 5 to about 300 minutes, the volumetric proportion of said hydrocarbon gas phase to said aqueous phase being from about 3 to 20.

2. The method of claim 1 wherein said hydrocarbon is ethylene.

3. The method of claim 1 wherein said hydrocarbon is acetylene.

4. The method of claim 2 wherein said aqueous phase contains a surface active agent effective to decrease the surface tension of water to about 15 to about 50 dynes per centimeter.

5. The method of claim 2 wherein said aqueous phase contains a water soluble polymer additive effective to increase the viscosity of water to about 5 to about 200 centipoises.

6. The method of claim 5 wherein said water soluble polymer additive comprises a protein having a molecular weight from 34,000 to 200,000.

7. The method of claim 5 wherein said water soluble polymer additive is carboxymethyl cellulose.

8. The method of claim 2 wherein said foam is applied at a rate sufficient to provide from 1.5 to 3 pounds of ethylene per acre of said pineapple plants.

9. The method of claim 2 wherein said foam is formed by the admixture of ethylene and an aqueous liquid in proportions of from 5 to 15 parts by volume of ethylene per part by volume of said liquid.

10. The method of claim 9 wherein said ethylene is employed in amounts from 7 to about 12 parts by volume per volume of said liquid.

* * * * *